(12) United States Patent
Watanabe

(10) Patent No.: US 7,225,269 B2
(45) Date of Patent: May 29, 2007

(54) NETWORK GATEWAY SYSTEM HAVING RULES FOR EXCHANGING PACKET, NETWORK GATEWAY METHOD, AND NETWORK GATEWAY DEVICE THEREFOR

(75) Inventor: Tomonori Watanabe, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 791 days.

(21) Appl. No.: 10/435,250

(22) Filed: May 12, 2003

(65) Prior Publication Data
US 2004/0010572 A1    Jan. 15, 2004

(51) Int. Cl.
G06F 15/173    (2006.01)

(52) U.S. Cl. ...................................... 709/238

(58) Field of Classification Search ................ 709/238, 709/223, 230
See application file for complete search history.

(56) References Cited

U.S. PATENT DOCUMENTS

| | | | | |
|---|---|---|---|---|
| 6,308,216 B1 * | 10/2001 | Goldszmidt et al. | ........ | 709/236 |
| 6,377,993 B1 * | 4/2002 | Brandt et al. | ................ | 709/227 |
| 6,611,875 B1 * | 8/2003 | Chopra et al. | .............. | 709/245 |
| 6,751,738 B2 * | 6/2004 | Wesinger et al. | ............. | 726/14 |
| 6,754,707 B2 * | 6/2004 | Richards et al. | ............ | 709/227 |
| 6,779,118 B1 * | 8/2004 | Ikudome et al. | ................ | 726/7 |
| 6,826,698 B1 * | 11/2004 | Minkin et al. | .................. | 726/1 |
| 6,850,943 B2 * | 2/2005 | Teixeira et al. | ................ | 707/10 |
| 6,857,018 B2 * | 2/2005 | Jiang | .......................... | 709/225 |
| 6,941,348 B2 * | 9/2005 | Petry et al. | .................. | 709/206 |
| 6,978,301 B2 * | 12/2005 | Tindal | .......................... | 709/223 |
| 7,028,244 B2 * | 4/2006 | Milliken | ...................... | 714/781 |
| 7,039,721 B1 * | 5/2006 | Wu et al. | .................... | 709/245 |

* cited by examiner

Primary Examiner—David Y. Eng
(74) Attorney, Agent, or Firm—Mattingly, Stanger, Malur & Brundidge, P.C.

(57) ABSTRACT

Handling a packet according to a gateway rule in a network gateway device ensures security. Centrally controlling the gateway rule in an administration center eliminates the need for individual user's consciousness of operation such as a firewall, which makes a network gateway system easy to use. Also, under certain conditions, the packet is handled according to a gateway rule in the network gateway device to reduce a network load. The administration center that holds and creates a gateway rule is provided. The network gateway device holds the gateway rule. When receiving a packet, if a gateway rule corresponding to the packet exists, the received packet is handled according to the gateway rule. If no gateway rule corresponding to the packet exists, the packet is transferred to the administration center, and then the corresponding gateway rule is received from the administration center so that update is performed.

12 Claims, 14 Drawing Sheets

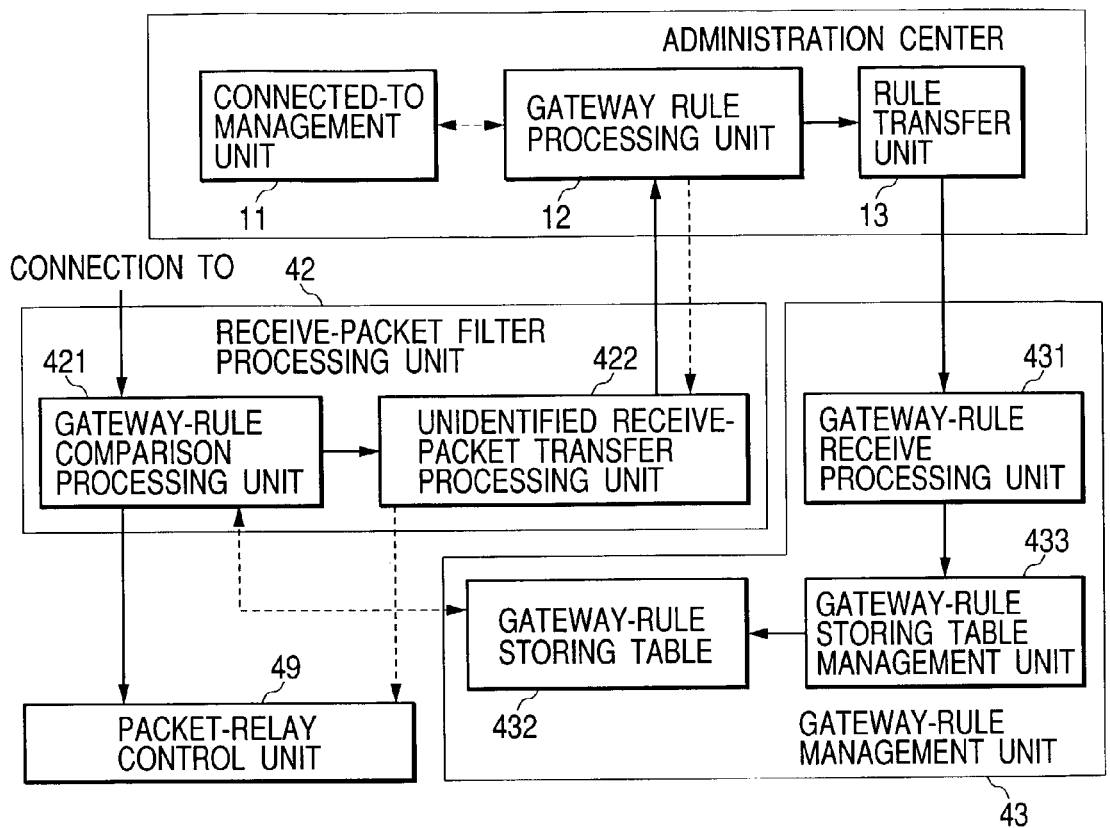

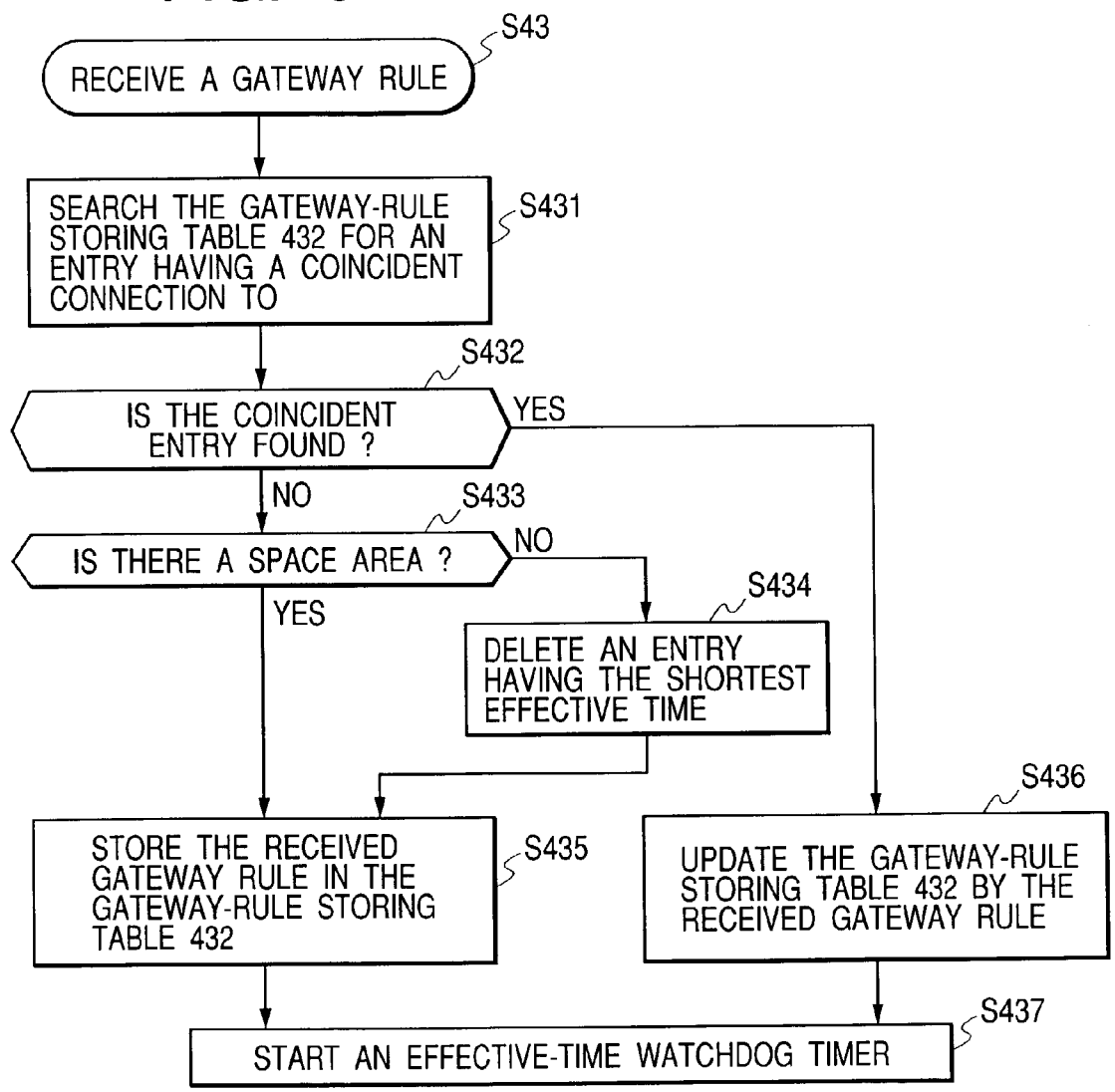
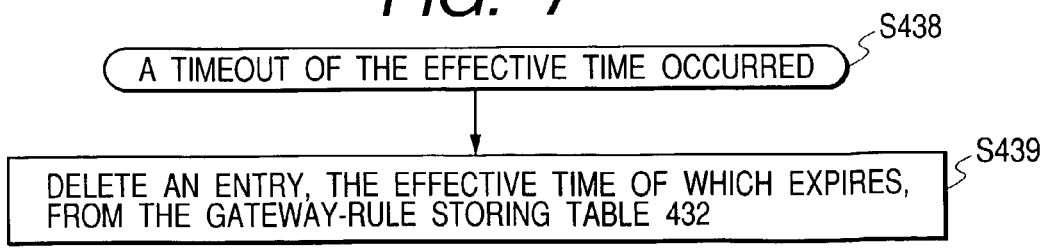

| RANGE OF DESTINATION ADDRESS | RANGE OF DESTINATION PORT NUMBER | RANGE OF SOURCE PORT NUMBER | DESTINATION ADDRESS | PROCESSING | EFFECTIVE TIME |
|---|---|---|---|---|---|
| 172.18.5.4-172.18.7.7 | 1234-2345 | 12-34 | — | REJECT | 3600 SEC. |
| 10.1.0.1-10.1.0.9 | 1-65535 | 1-65535 | — | REJECT | 1900 SEC. |
| 192.168.4.5 | 12345 | 222 | 123.4.5.6 | TRANSFER | 180 SEC. |
|  |  |  |  |  |  |

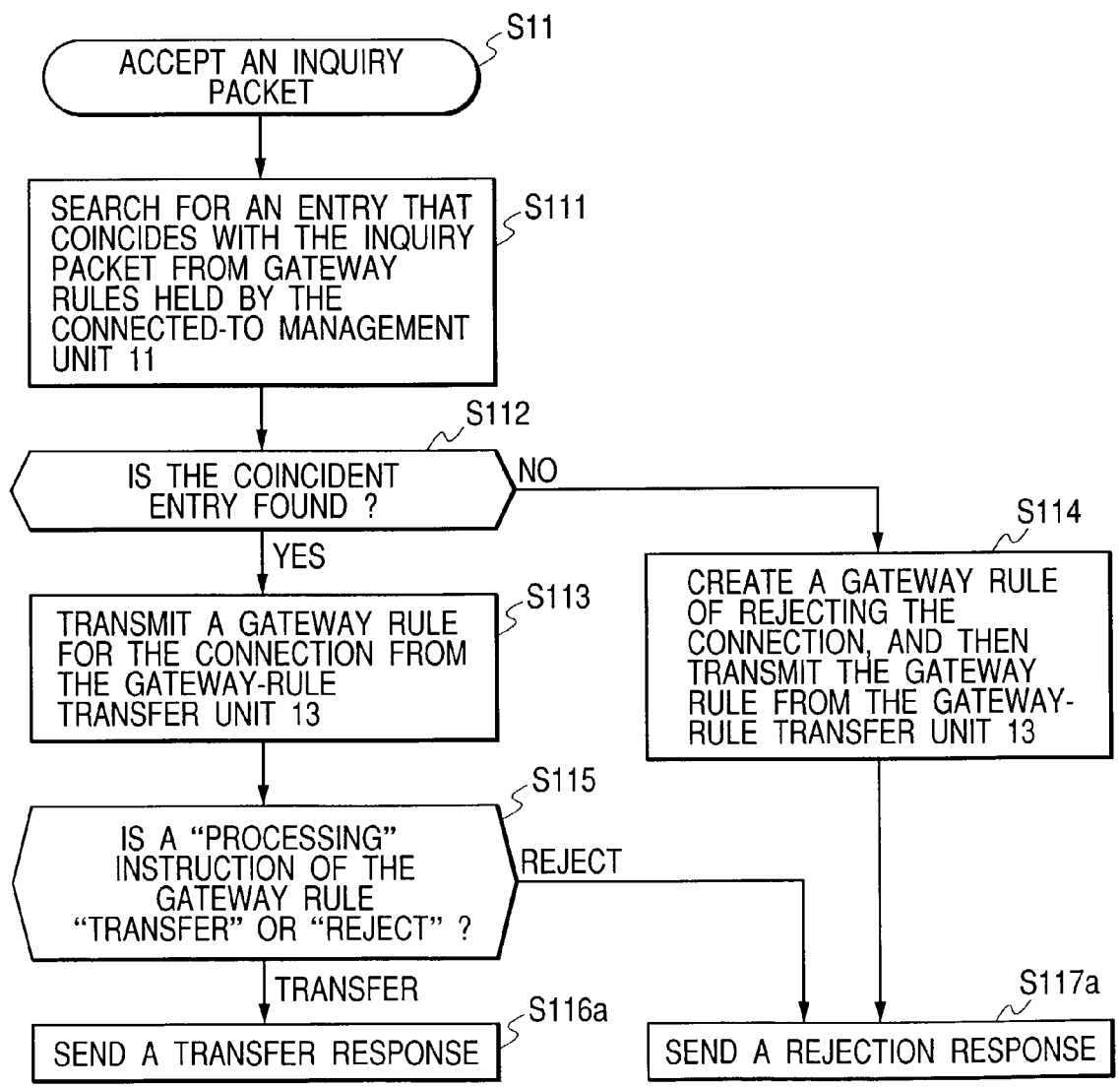

NETWORK GATEWAY SYSTEM HAVING RULES FOR EXCHANGING PACKET, NETWORK GATEWAY METHOD, AND NETWORK GATEWAY DEVICE THEREFOR

BACKGROUND OF THE INVENTION

The present invention relates to a network gateway system and a network gateway method, and more particularly to a network gateway system and a network gateway method which are suitable for centrally controlling gateway rules used to access and control communications between networks so that the network security is ensured.

One of the conventional technologies for interconnecting networks is known from the prior art described in Japanese Patent Laid-open No. Hei 9-204385. In this prior art, fire walls and packet filter devices are placed at points of interconnect in networks, and the validity of communication to be relayed through the devices is checked by gateway rules registered beforehand, and access control is performed to ensure the security.

SUMMARY OF THE INVENTION

The prior art is the technology in which a connection-state detection device is placed at a junction point connecting an external network to an administrated network and a rule for handling a received packet is held to control the packet according to the rule.

However, in the prior art, how to facilitate settings and operation is not taken into consideration. It is because in order to operate the system, a system administrator is required to set gateway rules for each device. As a result, knowledge of specifications of gateway rules and knowledge of a network protocol are required.

In addition, with widespread use of broadband networks, persistent connection to the network is becoming commonplace even at home. Accordingly, in order to ensure the security of an in-home network, it is necessary to install a fire wall and a packet filter device at a junction point connected to an external network. However, there is a problem that it is difficult for domestic users to deal with settings and operation.

The present invention is devised to solve the above-mentioned problem. An object of the present invention is to provide a network gateway system having a network gateway device that inter-connects networks, wherein handling a packet according to a gateway rule used to control the packet in the network gateway device to ensure the security, and centrally controlling the gateway rule in an administration center, permit the network gateway system to become easy to use, and consequently an individual user is not required to be conscious of operation such as a fire wall.

Further, another object of the present invention is to provide a network gateway system that can reduce a network load by transferring, from an administration center, a gateway rule used for a packet received by a network gateway device, and by using the gateway rule for a fixed period of time to handle the packet.

According to one aspect of the present invention, there is provided a network gateway system comprising: an administration center that centrally controls gateway rules; and a network gateway device placed at a junction point that connects a network to be protected to another network, wherein central control of communication packets can be achieved by transferring the communication packets to the administration center, and transferring only a communication packet that is permitted by the gateway rule, to a destination.

In addition, the present invention is also characterized by a function whereby a gateway rule used for a communication packet is applied in the administration center before the gateway rule is transferred to a network gateway device which is a source of the communication packet, and thereby a communication packet that meets the gateway rule can be handled in the network gateway device, with the result that a load concentrated on the administration center is distributed.

Moreover, the present invention is characterized in that a gateway rule held for a fixed period of time is discarded to reduce a gateway rule storing area of the network gateway device.

Further, a network gateway system according to the present invention is so devised that a network gateway device sends an inquiry about a gateway rule to an administration center, and handles, according to its response, a communication packet held in the network gateway device.

BRIEF DESCRIPTION OF THE DRAWINGS

FIG. 2 is a diagram illustrating a configuration of a network gateway device relating to receive processing, and its data flow, according to the first embodiment of the present invention;

FIG. 3 is a schematic diagram illustrating a gateway rule storing table 432 used for a receive packet;

FIG. 6 is a flowchart illustrating a flow of gateway rule receive processing by a gateway rule management unit 43 of the network gateway device 4;

FIG. 7 is a flowchart illustrating a flow of deletion processing performed when a timeout of the effective time of a gateway rule occurred;

FIG. 17 is a flowchart illustrating a flow of inquiry-packet acceptance processing by the administration center 1 for an unidentified transmit packet.

DESCRIPTION OF THE PREFERRED EMBODIMENTS

Embodiments according to the present invention will below be described with reference to FIGS. 1 through 17.

First Embodiment

A first embodiment according to the present invention will below be described with reference to FIGS. 1 through 11.

(1) A System Configuration of a Network Gateway System

To begin with, a system configuration of a network gateway system according to the first embodiment of the present invention will be described with reference to FIG. 1.

Figure 1:
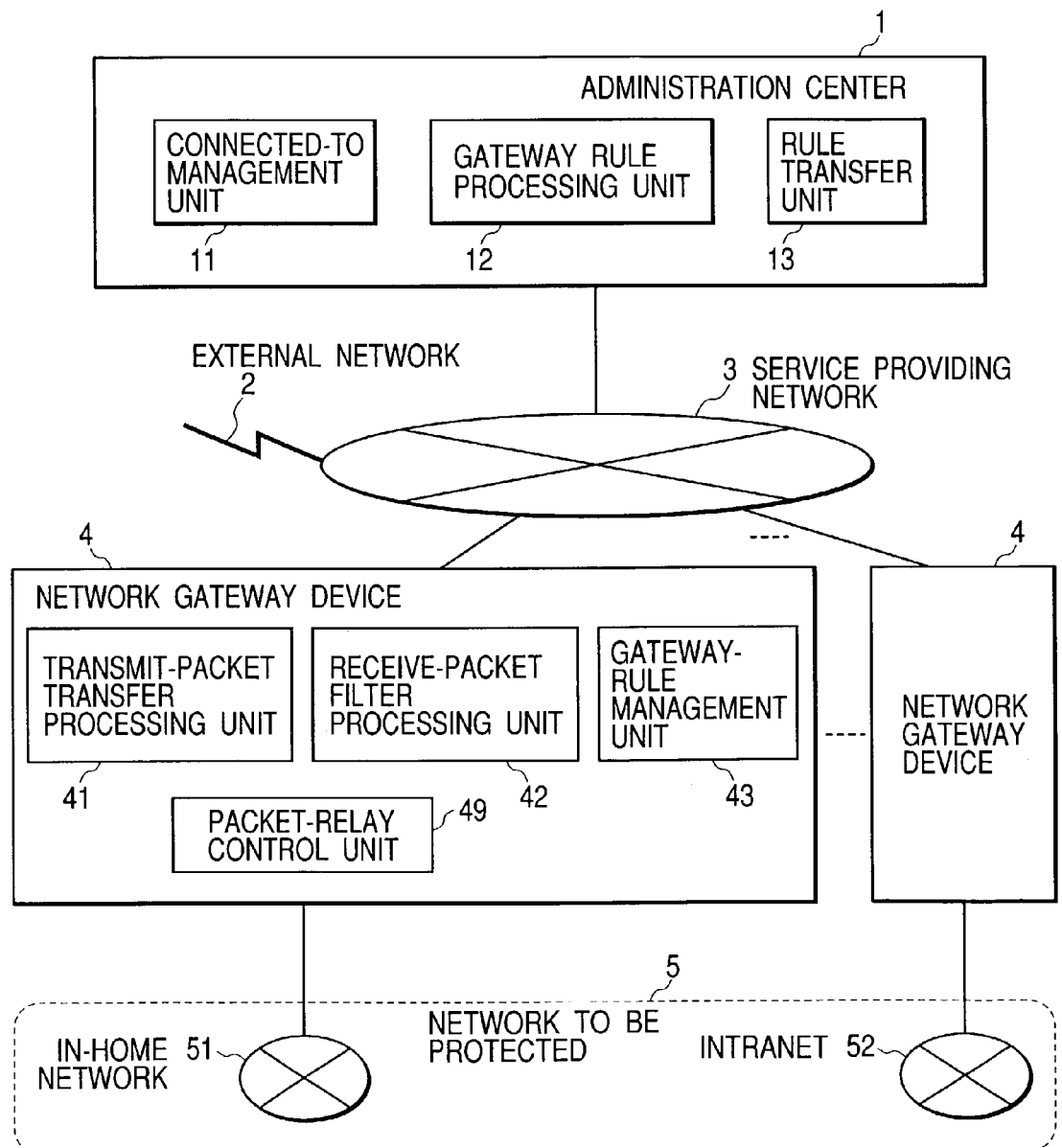
FIG. 1 is a diagram illustrating a system configuration of a network gateway system according to a first embodiment of the present invention.

FIG. 1 is a diagram illustrating the system configuration of the network gateway system according to the first embodiment of the present invention.

A network configuration according to this embodiment is configured such that networks to be protected 5 such as an in-home network 51 and an intranet 52 are inter-connected, or are connected to an external network 2, through network gateway devices 4 via a service providing network 3. In addition, an administration center 1, which is connected to the service providing network 3 or the external network 2, works with the network gateway device 4 to control accesses to the network to be protected 5 and other networks so that the security is ensured.

The network gateway device 4 comprises a transmit-packet processing unit 41, a receive-packet filter processing unit 42, a gateway rule management unit 43, and a packet-relay control unit 49. The transmit-packet processing unit 41 is a part that controls a destination of a transmit packet. The receive-packet filter processing unit 42 is a part that controls whether or not to relay a receive packet, and the like. The gateway rule management unit 43 is a part that holds and manages information about gateway rules such as a destination of a transmit packet and whether or not to relay a receive packet. The gateway rules will be described in detail later using a concrete example. The packet-relay control unit 49 is a part that manages communication with the network to be protected 5.

Incidentally, in this specification, the receive packet means a packet which the network gateway device 4 receives from the external network 2 or the service providing network 3 and then transmits to the network to be protected 5. In contrast with this, the transmit packet means a packet which the network gateway device 4 receives from the network to be protected 5 and then transmits to the external network 2 or the service providing network 3. The administration center 1 comprises a connected-to management unit 11, a gateway rule processing unit 12, and a rule transfer unit 13. The connected-to management unit 11 is a part that holds and manages gateway rules such as a destination of a transmit packet, and whether or not to relay a receive packet, for each network to be protected 5. The gateway rule processing unit 12 is a part that handles transmit and receive packets, which are transferred from the network gateway device 4, according to the gateway rules. The rule transfer unit 13 is a part that transfers the gateway rules used in the gateway rule processing unit 12 to the network gateway device.

In this embodiment, the administration center 1 is connected to the network gateway device 4 via the service providing network 3. However, a secure communication means such as a virtual private network (VPN) may be used as the communication between the administration center 1 and the network gateway device 4. Using the VPN permits the administration center 1 and the network gateway device 4 to be directly connected to the external network 2, which ensures the security.

(II) Receive Processing of Network Gateway Device

Next, receive processing of the network gateway device according to the first embodiment of the present invention will be described with reference to FIGS. 2 to 4.

(II-1) Configuration of the Network Gateway Device Relating to Receive Processing and its Data Flow To begin with, a configuration of the network gateway device relating to the receive processing, and its data flow, will be described with reference to FIG. 2.

FIG. 2 is a diagram illustrating the configuration of the network gateway device relating to the receive processing, and its data flow, according to the first embodiment of the present invention.

FIG. 2 illustrates flows of a receive packet, gateway rule information, etc. observed when a packet is transmitted from the external network 2 or the service providing network 3 to the network to be protected 5 and then the network gateway device receives the packet.

The receive-packet filter processing unit 42 in the network gateway device 4 comprises a gateway rule comparison processing unit 421, and an unidentified receive-packet transfer processing unit 422. The gateway-rule comparison processing unit 421 is a part that compares a receive packet with a gateway rule held in the gateway-rule management unit 43 to judge whether or not to relay the receive packet. The unidentified receive-packet transfer processing unit 422 is a part that transfers an unidentified receive packet, a gateway rule of which is not defined in the network gateway device, to the administration center 1 and relays only a response packet permitted by the administration center 1.

When the receive-packet filter processing unit 42 receives a packet, and if a gateway rule is not defined in the network gateway device, the receive packet is transferred to the administration center 1. In response to this, in the administration center 1, the gateway rule processing unit 12 searches for a gateway rule which coincides with contents of the unidentified receive packet from the gateway rules held by the connected-to management unit 11. Then, the rule transfer unit 13 transmits the gateway rule that coincides with the contents to the gateway-rule management unit 43 of the network gateway device by use of a file transfer protocol, etc. In addition, the receive packet that is permitted to be relayed is sent back to the receive-packet filter processing unit 42.

Moreover, the gateway-rule management unit 43 comprises a gateway-rule receive processing unit 431, a gateway-rule storing table 432, and a gateway-rule storing table management unit 433. The gateway-rule receive processing unit 431 is a part that communicates with the rule transfer unit 13. The gateway-rule storing table 432 is a table for storing gateway rules indicating how to handle a packet. The gateway-rule storing table management unit 433 is a part that accesses and manages this gateway-rule storing table 432.

(II-2) Gateway Rules for Receiving

Next, gateway rules used for a network gateway system according to the present invention will be described with reference to FIG. 3.

FIG. 3 is a schematic diagram illustrating the gateway-rule storing table 432 used for a receive packet.

The gateway rules describe how to handle a received packet in the network gateway device 4. FIG. 3 illustrates gateway rules used for a receive packet. The gateway-rule storing table 432 prescribes conditions of a target packet, processing corresponding to the target packet, the effective time, etc.

The gateway rules in FIG. 3 show a configuration example for a receive packet of the TCP/IP (Transmission Control Protocol/Internet Protocol) protocol, holding the following information: a range of a source address; a range of a source port number that identifies a connected-from application; a range of a destination port number that identifies a connected-to application; processing performed when information on a receive packet coincides with an entry; and the effective time of the entry. The gateway-rule comparison processing unit 421 shown in FIG. 2 performs processing described in a "processing" field of the entry when a combination of a source address, a source port number, and a destination port number, relating to a receive packet, coincides with a receive packet entry in the gateway-rule storing table 432. The above-mentioned address is an IP address, and the port is a port of TCP, meaning that when a packet has an address and a port included in the table, the packet is "discarded", or "transferred" to the network to be protected, as described in the "processing" field. In addition, the effective time is time indicating a length of time during which an entry in the gateway-rule storing table 432 is effective. An entry, the effective time of which has expired, is deleted. This permits a new gateway rule to be accepted when updating the gateway rules in the administration center 1.

It is to be noted that although an embodiment in FIG. 3 uses information about a range of a source address and a port number, the information may be combined with destination address information, or other protocols and items may also be compared.

For example, the following may also be used as rule information: a URL (Uniform Resource Locator) specifying a resource on the Internet by use of a name; and TOS (Type of Service) and security information that are included in an IP header. In addition, even if a protocol is not the TCP/IP, gateway rules can be defined according to the protocol.

Moreover, in this embodiment, each entry in the gateway-rule storing table 432 holds effective-time information, and thereby an old gateway rule is discarded, and then the administration center 1 is inquired about the newest gateway rule. However, it may also be so devised that when changing a gateway rule in the administration center 1, an instruction to delete an old gateway rule is transmitted to the gateway-rule management unit 43 of the network gateway device 4 and then the entry is searched for in the gateway-rule storing table management unit 433 to discard the entry.

(II-3) Packet Receive Processing of the Network Gateway Device 4

Next, packet receive processing of the network gateway device 4 will be described with reference to FIG. 4.

Figure 4:
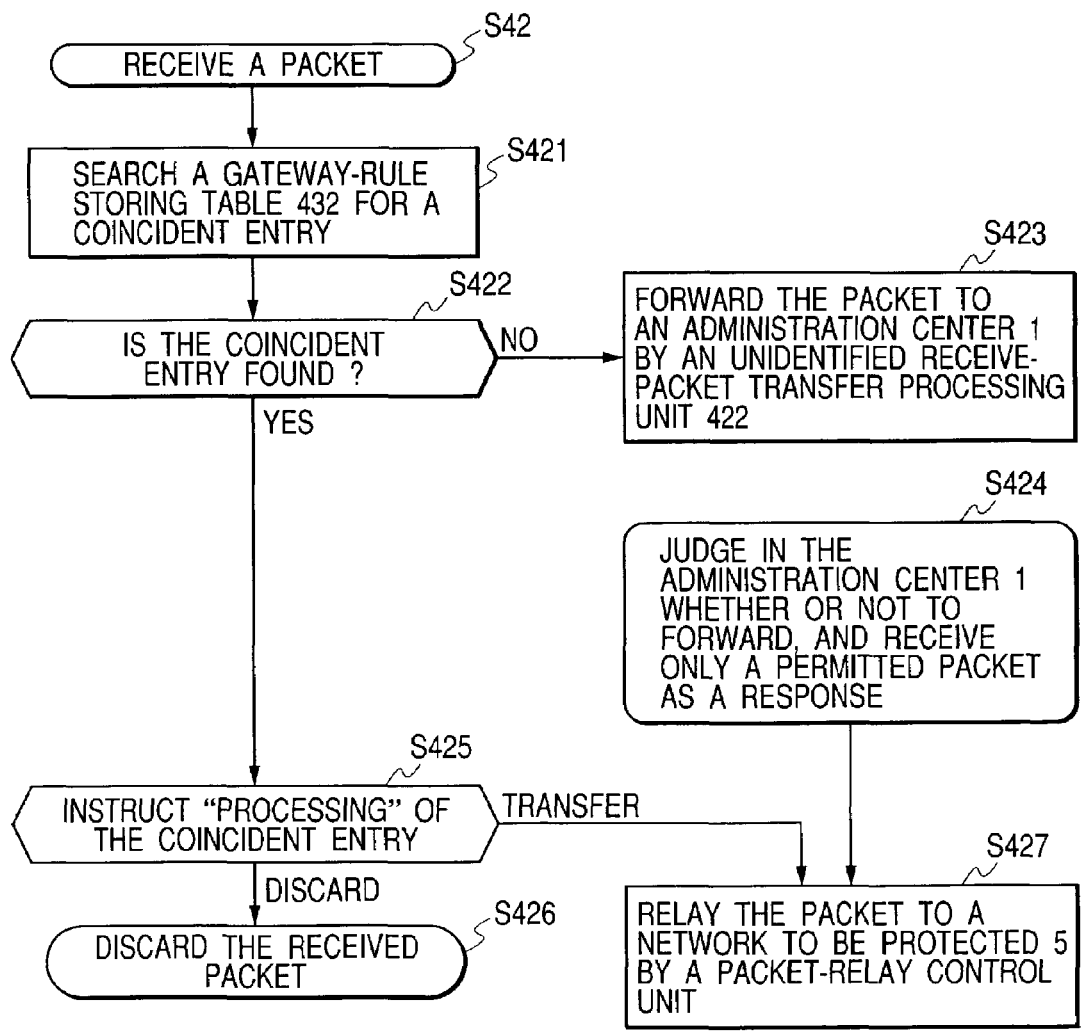
FIG. 4 is a flowchart illustrating a flow of receive packet processing by a receive-packet filter processing unit 42 of a network gateway device 4 according to the first embodiment.

FIG. 4 is a flowchart illustrating a flow of receive packet processing by the receive-packet filter processing unit 42 of the network gateway device 4 according to the first embodiment.

To begin with, upon receipt of a packet from a connection to, the gateway-rule comparison processing unit 421 searches the gateway-rule storing table 432 shown in FIG. 3 for an entry having a source address and a source port number that coincide with those of the receive packet (S421).

If the coincident entry is not found (S422), the packet is passed to the unidentified receive-packet transfer processing unit 422, which forwards the packet to the administration center 1 (S423). It is to be noted that the undermentioned "unidentified receive packet" denotes a packet, a gateway rule of which is not defined in the network gateway device when the packet is received.

If the coincident entry is found (S422), a "processing" instruction of the entry in the gateway-rule storing table 432 is referred to (S425). If the "processing" instruction is "discard" that does not permit a connection, the receive packet is discarded (S426). If the "processing" instruction is "transfer" that permits a connection, the packet is passed to the packet-relay control unit 49, which relays the packet to the network to be protected 5 (S427).

On the other hand, whether or not to transfer the unidentified receive packet which has been transferred to the administration center 1 (S423) is judged according to a flow of unidentified receive packet processing of the administration center 1 described later in FIG. 5. Only if a connection is permitted, the packet is sent back to the receive-packet filter processing unit 42 (S424), and then the packet is passed to the packet-relay control unit 49, which relays the packet to the network to be protected (S427). As a result, even in the case of communication whose gateway rule is not held in the network gateway device 4, its processing is entrusted to the administration center 1, which enables centralized control of packet processing.

(III) Unidentified Receive-Packet Acceptance Processing of the Administration Center 1

Next, unidentified receive-packet acceptance processing of the administration center 1 will be described with reference to FIG. 5.

Figure 5:
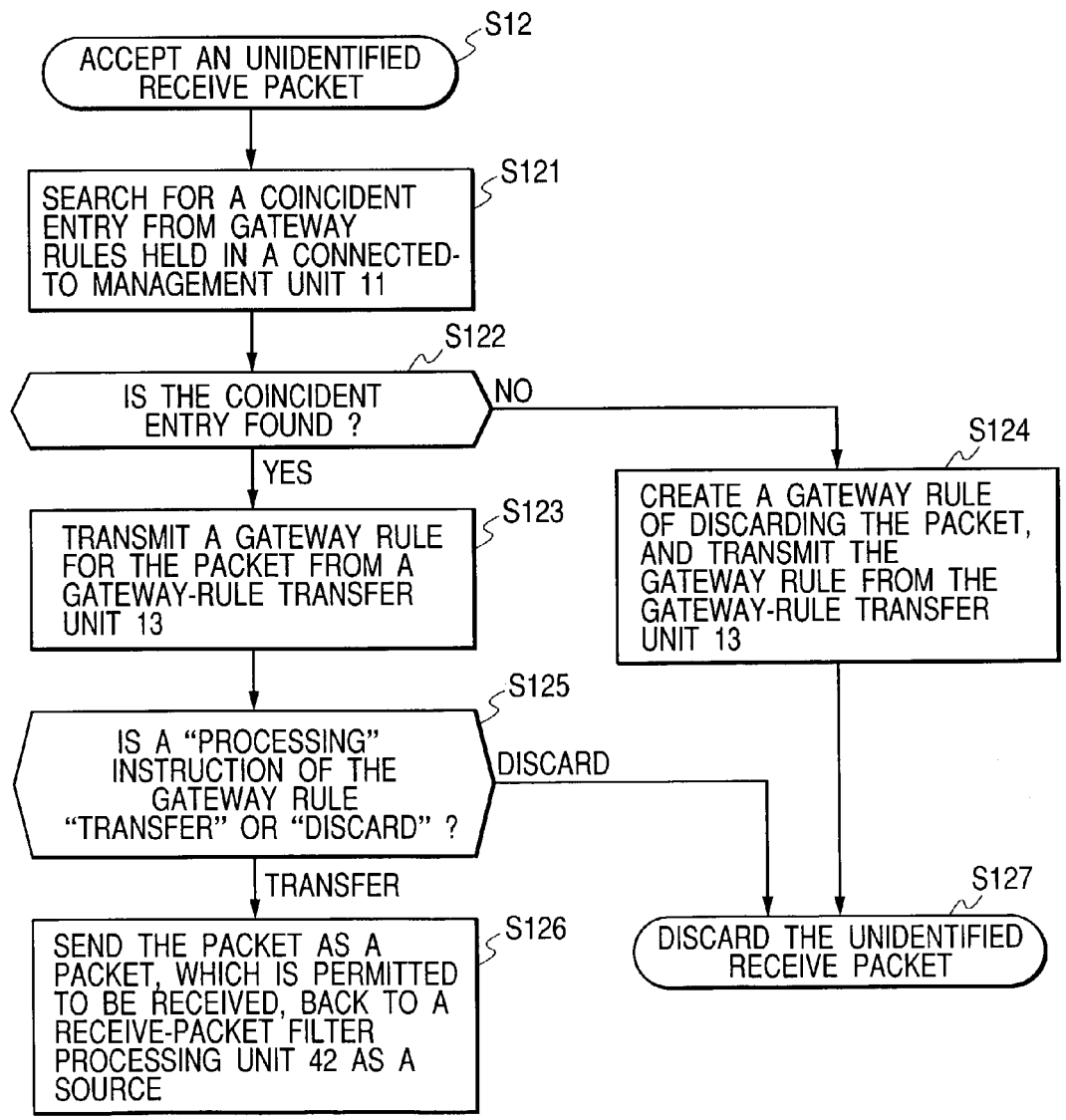
FIG. 5 is a flowchart illustrating a flow of unidentified receive-packet acceptance processing of an administration center 1.

FIG. 5 is a flowchart illustrating a flow of the unidentified receive-packet acceptance processing of the administration center 1.

As described above, if a gateway rule of a receive packet is not defined in the network gateway device 4, the receive packet is transferred to the administration center 1 as an unidentified receive packet. The connected-to management unit 11 of the administration center 1 shown in FIG. 2 holds the same gateway rules as those in the gateway-rule storing table 432, shown in the configuration example in FIG. 3, for each source network gateway device 4.

Upon acceptance of the unidentified receive packet transferred from the network gateway device 4, the gateway rule processing unit 12 of the administration center 1 searches, from the gateway rules held by the connected-to management unit 11, for an entry having a source address and a source port number that coincide with those of the unidentified receive packet (S121).

If the coincident entry is not found (S122), a gateway rule of discarding the packet is created, and then the gateway rule is transmitted from the rule transfer unit 13 to the gateway-rule management unit 43 of the network gateway device 4 which is a source of the unidentified receive packet (S124) so as to discard the unidentified receive packet (S127). To be more specific, if a gateway rule of the packet is not defined in the administration center 1, a rule of discarding the packet is created as default. In this context, processing performed when the network gateway device 4 receives a gateway rule will be described later.

If the coincident entry is found (S122), the gateway rule is transmitted from the rule transfer unit 13 to the gateway-rule management unit 43 of the network gateway device 4 which is a source of the unidentified receive packet (S123). Then, as a result of referring to a "processing" instruction of the gateway rule by the gateway-rule management unit 43 (S125), if the "processing" instruction is "discard" that does not permit a connection, the receive packet is discarded (S127); and if the "processing" instruction is "transfer" that permits a connection, the receive packet is sent back to the receive-packet filter processing unit 42 of the source network gateway device 4 (S126) so that the receive packet is relayed to the network to be protected.

Thus, a basic way of thinking of the present invention is that gateway rules are centrally controlled in the administration center 1. In addition, when a packet comes to the network device 4, if a gateway rule of the packet is not defined, the gateway rule is transferred from the administration center 1. As a result, when the same packet comes after that, the gateway rule held in the network gateway device 4 can be used. Accordingly, it is possible to speed up processing of the receive packet, and to avoid a load from being centralized in the administration center 1.

(IV) Gateway-Rule Receive Processing of the Network Gateway Device 4

Next, packet receive processing of the network gateway device 4 will be described with reference to FIG. 6.

FIG. 6 is a flowchart illustrating a flow of the gateway-rule receive processing by the gateway-rule management unit 43 of the network gateway device 4.

If a gateway rule is transmitted from the rule transfer unit 13 of the administration center 1, the gateway rule is received by the gateway-rule receive processing unit 431 of the gateway-rule management unit 43 in the network gateway device 4. Then, the gateway-rule storing table management unit 433 of the gateway-rule management unit 43 searches the gateway-rule storing table 432 for an entry having a range of an address, a range of a port number, etc. that coincide with those of the received gateway rule (S431).

In this case, if the coincident entry is found (S432), contents of the found entry in the gateway-rule storing table 432 is updated by the received gateway rule (S436) before restarting an effective-time watchdog timer of the entry (S437).

If the coincident entry is not found (S432), a check is made as to whether or not the gateway-rule storing table 432 has a space area for storing new information (S433). If there is no space area, an entry with the shortest remaining effective time is searched for as the oldest information, and is then deleted to make a space area (S434). After that, the received gateway rule is stored in the gateway-rule storing table 432 (S435) before starting the effective-time watchdog timer (S437).

To be more specific, the gateway rule according to the present invention has the effective time, and an entry having shorter remaining effective time is deleted, with the result that the most recently received gateway rule is held in the gateway-rule storing table 432. This is based on the way of thinking that an entry's gateway rule having shorter remaining effective time has less utility value than that of a gateway rule of an entry having longer remaining effective time. After the gateway rule is deleted in this manner, even if a packet which should be treated by the gateway rule comes, the gateway rule is transferred again from the administration center 1 if necessary. Therefore, the functionality will not be lost.

(V) Deletion Processing Performed when a Timeout of the Effective Time of a Gateway Rule Occurs Next, deletion processing performed when a timeout of the effective time of a gateway rule occurs will be described with reference to FIG. 7.

FIG. 7 is a flowchart illustrating a flow of the deletion processing performed when a timeout of the effective time of a gateway rule occurs.

As soon as the gateway-rule storing table management unit 433 is notified by a trigger of the timer for a fixed period of time that a timeout of the effective time occurred, the gateway-rule storing table management unit 433 deletes an entry, the effective time of which has expired, from the gateway-rule storing table 432 (S439).

In this manner, because a gateway rule is deleted after a fixed period of time, if a receive packet corresponding to the gateway rule comes after the deletion, the newest gateway rule is received from the administration center 1. Accordingly, even if the gateway rule is updated in the administration center 1, it is possible to prevent a discrepancy between the network gateway device 4 and the administration center 1 from arising.

In this embodiment, the timer measures the effective time by use of a trigger for a fixed period of time, and judging from the remaining effective time, the gateway rule is deleted. However, also other methods could conceivably be available.

For example, it may also be so devised that a certain time of day (for example, 0:00 a.m.) is predetermined and a gateway rule is deleted at the predetermined time (at 0:00 a.m.). In addition, there is also another method in which ON/OFF of a power supply of the network gateway device 4 is used as a trigger to delete a gateway rule. Moreover, a gateway rule may also be deleted when the number of packets handled by use of the gateway rule reaches a predetermined number.

This embodiment only shows that a gateway rule corresponding to an unidentified packet is transferred and created according to a gateway rule in the administration center 1. However, it may also be so devised that a state of connection for each network gateway device is centrally monitored by recording the result of judging a gateway rule.

According to this embodiment, a gateway rule held in the network gateway device 4 is discarded when the effective time expires. Therefore, if appropriate effective time is predetermined for each gateway rule, the administration center 1 can properly perform centralized control of gateway rules in all of the network gateway devices 4.

(VI) Transmission Processing of the Network Gateway Device

Next, transmission processing of the network gateway device according to the first embodiment of the present invention will be described with reference to FIGS. 8 to 10.

(VI-1) Configuration of the Network Gateway Device Relating to the Transmission Processing and its Data Flow To begin with, a configuration of the network gateway device relating to the transmission processing, and its data flow, will be described with reference to FIG. 8.

Figures 8, 9:
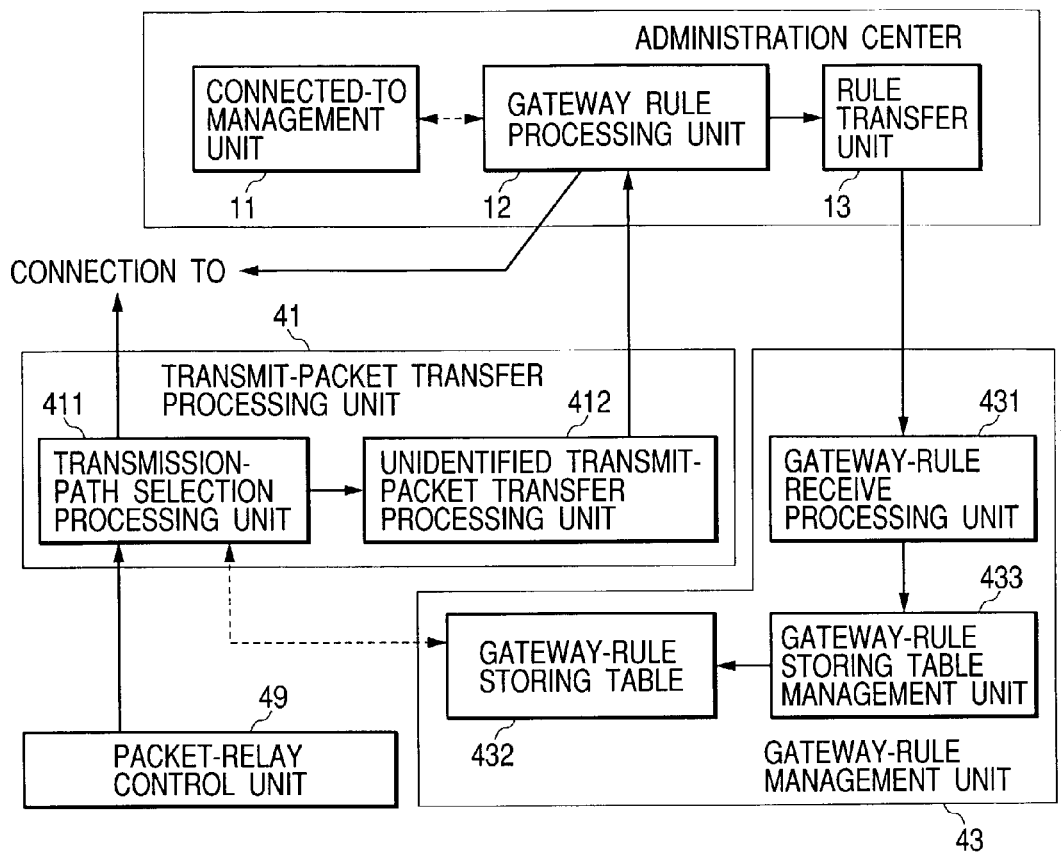
FIG. 8 is a diagram illustrating a configuration of a network gateway device relating to transmission processing, and its data flow, according to the first embodiment of the present invention.
FIG. 9 is a schematic diagram illustrating a gateway rule storing table 432 used for a transmit packet.

FIG. 8 is a diagram illustrating the configuration of the network gateway device relating to the transmission processing, and its data flow, according to the first embodiment of the present invention.

FIG. 8 illustrates flows of a transmit packet, gateway-rule information, etc. observed when a packet is transmitted from the network to be protected 5 to the network gateway device and then the packet is transmitted to the external network 2 and the service providing network 3.

A transmit-packet transfer processing unit 41 comprises a transmission-path selection processing unit 411, and an unidentified transmit-packet transfer processing unit 412. The transmission-path selection processing unit 411 is a part that compares a transmit packet with a gateway rule held in the gateway-rule management unit 43 to judge whether or not to transfer the transmit packet, and that determines a destination if the transmit packet is transmitted. The unidentified transmit-packet transfer processing unit 412 is a part that transfers an unidentified transmit packet having no gateway rule to the administration center 1 and thereby requests the administration center 1 to perform processing.

When the unidentified transmit packet is transmitted from the network gateway device 4, the gateway rule processing unit 12 in the administration center 1 searches for a gateway rule which coincides with contents of the unidentified transmit packet from the gateway rules held by the connected-to management unit 11. Then, the rule transfer unit 13 transmits the gateway rule which coincides with the contents to the gateway-rule management unit 43 of the network gateway device using a file transfer protocol, etc. In addition to it, a transmit packet, the relay of which is permitted according to the gateway rule, is transmitted to a specified destination.

(II-2) Gateway Rule for Transmission

Next, a gateway rule for a transmit packet, which is used for a network gateway system according to the present invention, will be described with reference to FIG. 9.

FIG. 9 is a schematic diagram illustrating the gateway-rule storing table 432 used for a transmit packet.

The gateway rule for a receive packet has already been described. What will be described here is how to handle a transmit packet that is transmitted from the network to be protected 5 to the external network 2 or the service providing network 3. Conditions of a target packet, processing corresponding to it, the effective time, a destination, and the like, are prescribed in the gateway-rule storing table 432.

The gateway rules in FIG. 9 show a configuration example for a transmit packet of the TCP/IP protocol, holding the following information: a range of a destination address; a range of a destination port number that identifies a connected-to application; a range of a source port number that identifies a connected-from application; a destination address; processing performed when information on a transmit packet coincides with an entry; and the effective time of the entry. The information is almost similar to that of the receive packet described above. A point of difference is that the gateway-rule storing table used for transmit packets has a "destination" field.

The transmission-path selection processing unit 411 performs processing described in a "processing" field of the entry when a combination of a destination address, a destination port number, and a source port number, relating to a transmit packet, coincides with a transmit packet entry in the gateway-rule storing table 432. To be more specific, if "reject" is described in the "processing" field, transmission of the transmit packet to the external network 2 or the service providing network is rejected. If "transfer" is described, the transmit packet is transmitted to a destination address of the packet, or the destination address described in the "destination" field.

Although the embodiment in FIG. 9 uses information about a range of a source address and a port number, the information may be combined with destination address information, etc., or other protocols and items may also be compared. This is similar to the case of the receive packet.

(VI-3) Packet Transmission Processing of the Network Gateway Device 4

Next, packet transmission processing of the network gateway device 4 will be described with reference to FIG. 10.

Figure 10:
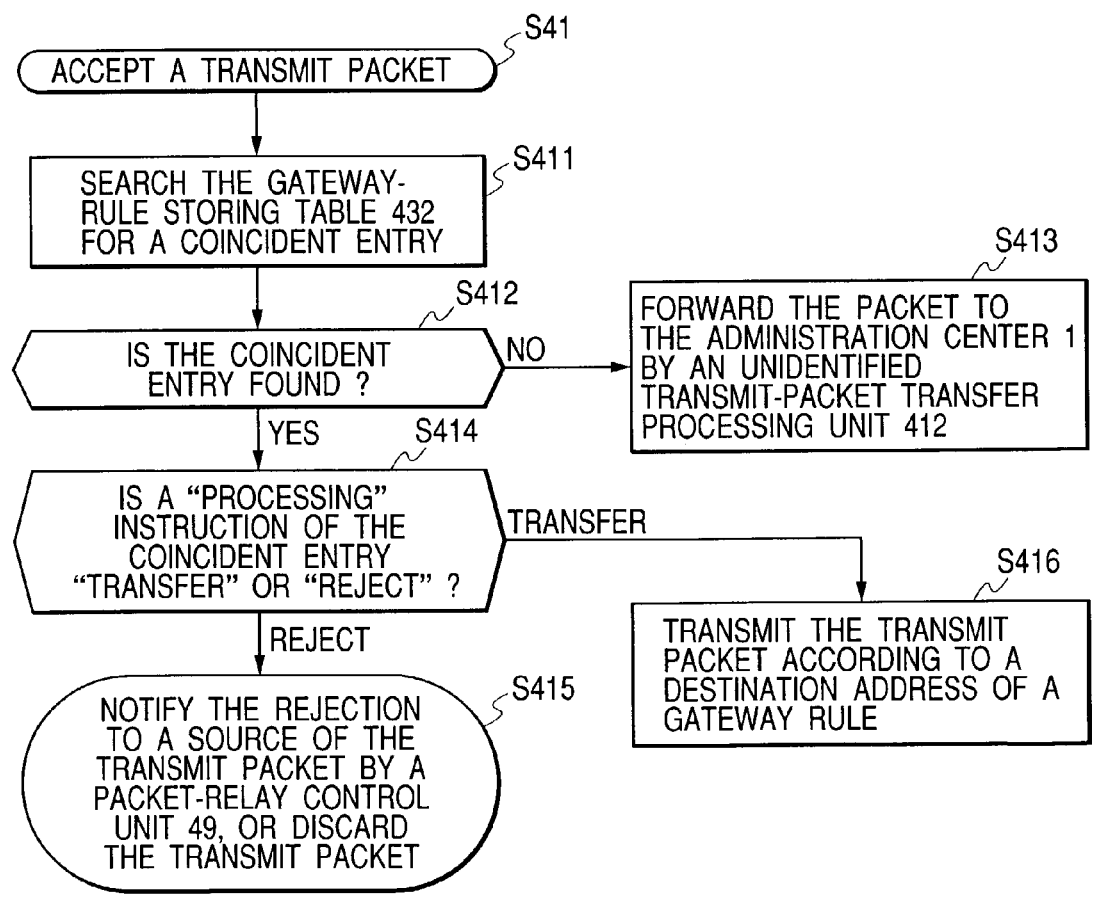
FIG. 10 is a flowchart illustrating a flow of transmit packet processing by a transmit-packet transfer processing unit 41 of the network gateway device 4 according to the first embodiment.

FIG. 10 is a flowchart illustrating a flow of transmit packet processing by the transmit-packet transfer processing unit 41 of the network gateway device 4 according to the first embodiment.

In the first place, upon receiving a packet from the network to be protected 5 via the packet-relay control unit 49, the transmission-path selection processing unit 411 searches the gateway-rule storing table 432 for an entry having a destination address, a destination port number, etc. that coincide with those of the transmit packet (S411). Then, if the coincident entry is not found (S412), the packet is passed to the unidentified transmit-packet transfer processing unit 412, which forwards the packet to the administration center 1 (S413). If the coincident entry is found (S412), a "processing" instruction of the entry is referred to (S414). As a result of the reference, if the "processing" instruction is "reject" that does not permit a connection, the source of the transmit packet is notified of the rejection by the packet-relay control unit 49, or the transmit packet is discarded (S415). If the "processing" instruction is "transfer" that permits a connection, a destination field of the gateway rule is referred to. If a destination is specified, the transmit packet is transmitted to an address specified in the destination field. If no destination is specified, the transmit packet is transmitted to a destination address of the transmit packet (S416).

It is to be noted that as described below, the unidentified transmit packet transferred to the administration center 1 is "transferred" or "discarded" in the administration center 1 according to the gateway rule.

(VII) Unidentified Transmit-Packet Acceptance Processing of the Administration Center 1

Next, unidentified transmit-packet acceptance processing of the administration center 1 will be described with reference to FIG. 11.

Figure 11:
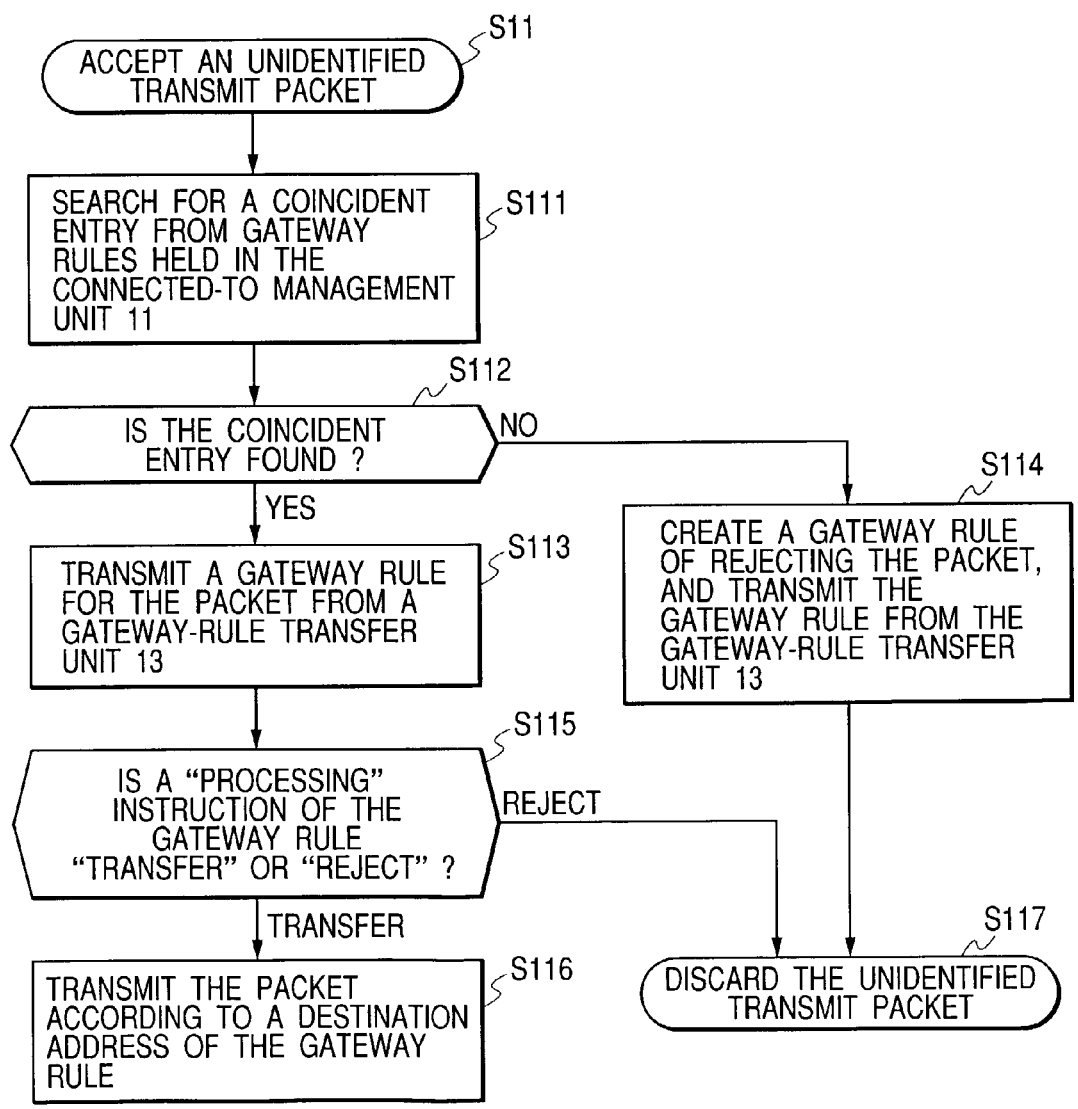
FIG. 11 is a flowchart illustrating a flow of unidentified transmit-packet acceptance processing of the administration center 1.

FIG. 11 is a flowchart illustrating a flow of the unidentified transmit-packet acceptance processing of the administration center 1.

In item (III), the flow of the unidentified receive-packet acceptance processing of the administration center 1 has been described. The flow of the unidentified transmit-packet acceptance processing is almost similar to the unidentified receive-packet acceptance processing.

If a gateway rule of a transmit packet is not defined in the network gateway device 4, the transmit packet is transferred to the administration center 1 as an unidentified transmit packet. The connected-to management unit 11 of the administration center 1 shown in FIG. 8 holds the same gateway rules as those in the gateway-rule storing table 432, shown in the configuration example in FIG. 9, for each source network gateway device 4.

Upon acceptance of the unidentified transmit packet transferred from the network gateway device 4, the gateway rule processing unit 12 of the administration center 1 searches the gateway rules held by the connected-to management unit 11 for an entry having a destination address and a destination port number that coincide with those of the unidentified transmit packet (S111). If the coincident entry is not found (S112), a gateway rule of rejecting the transmission of the packet is created, and then the gateway rule is transmitted from the rule transfer unit 13 to the gateway-rule management unit 43 of the network gateway device 4 which is a source of the unidentified transmit packet (S114). At the same time, the unidentified transmit packet is discarded because the transmission is not permitted (S117). If the coincident entry is found (S112), the gateway rule is transmitted from the rule transfer unit 13 to the gateway-rule management unit 43 of the network gateway device 4 which is a source of the unidentified receive packet (S113). As a result of referring to a "processing" instruction of the gateway rule by the gateway-rule management unit 43 (S115), if the "processing" instruction is "reject" that does not permit a connection, the transmit packet is discarded (S117). If the "processing" instruction is "transfer", a destination field of the gateway rule is referred to. If a destination is specified, the transmit packet is transmitted to an address specified in the destination field. If no destination is specified, the transmit packet is transmitted to a destination address of the transmit packet (S116).

It is to be noted that the gateway-rule receive processing performed when the administration center 1 receives an unidentified transmit packet and transmits a gateway rule to the network gateway device 4 has already-been described in item (IV).

As described above, according to the present invention, gateway rules are centrally controlled in the administration center 1. The gateway rule for a receive packet is similar to that of a transmit packet. Transferring a gateway rule to the network gateway device 4 enables speedup of the transmit-packet transfer processing 41 after that, and avoidance of a load from being centralized in the administration center 1, while the gateway rules are centrally controlled, which are also similar advantages produced.

(VIII) Advantages of this Embodiment

In this embodiment, the administration center 1 centrally controls gateway rules of a receive packet and a transmit packet that are handled in the network device 4. Accordingly, management of packets in the whole network and management of the network gateway device 4 become easy, and thereby the information security of the network can be increased.

In addition, a gateway rule of the packet which has once been received by the network gateway device 4 is transferred from the administration center. Accordingly, by use of the gateway rule, a judgment of processing can be made in the network gateway device 4 for a fixed period of time, which makes it possible to prevent a load from being concentrated on the administration center 1 or a specific network.

If a gateway rule of a receive packet or that of a transmit packet is not defined in the network gateway device 4, the receive packet or the transmit packet is transferred to the administration center 1 as an unidentified packet. Therefore, memory mechanisms for holding packets, etc. become unnecessary in the network gateway device.

Moreover, since the effective time of a gateway rule is provided, even if the gateway rule is updated in the administration center 1, the inconsistency between the administration center 1 and the network gateway device 4 will be cleared after a fixed period of time.

Second Embodiment

A second embodiment according to the present invention will be described with reference to FIGS. 12 to 17 below.

In the first embodiment, when the network gateway device 4 receives a receive packet or a transmit packet, if a gateway rule of the packet is not defined, the packet is transferred to the administration center 1 and thereby processing after that is entrusted to the administration center 1.

In this embodiment, when the network gateway device 4 receives a receive packet or a transmit packet, if a gateway rule of the packet is not defined, the packet is held in the network gateway device 4 and then an inquiry about processing is sent to the administration center 1. According to its response, the network gateway device 4 performs the processing after that.

A further description will be given hereafter with a particular emphasis on differences between the first and second embodiments.

(I) A System Configuration of a Network Gateway System

Although a system configuration of a network gateway system is substantially the same as that of the first embodiment shown in FIG. 1, there are the following points of difference: functions of the administration center 1; and functions of the transmit-packet transfer processing unit 41 and receive-packet filter processing unit 42 in the network gateway device 4.

(II) Receive Processing of the Network Gateway Device

Next, receive processing of the network gateway device according to the second embodiment of the present invention will be described with reference to FIGS. 12 and 13.

Figure 12:
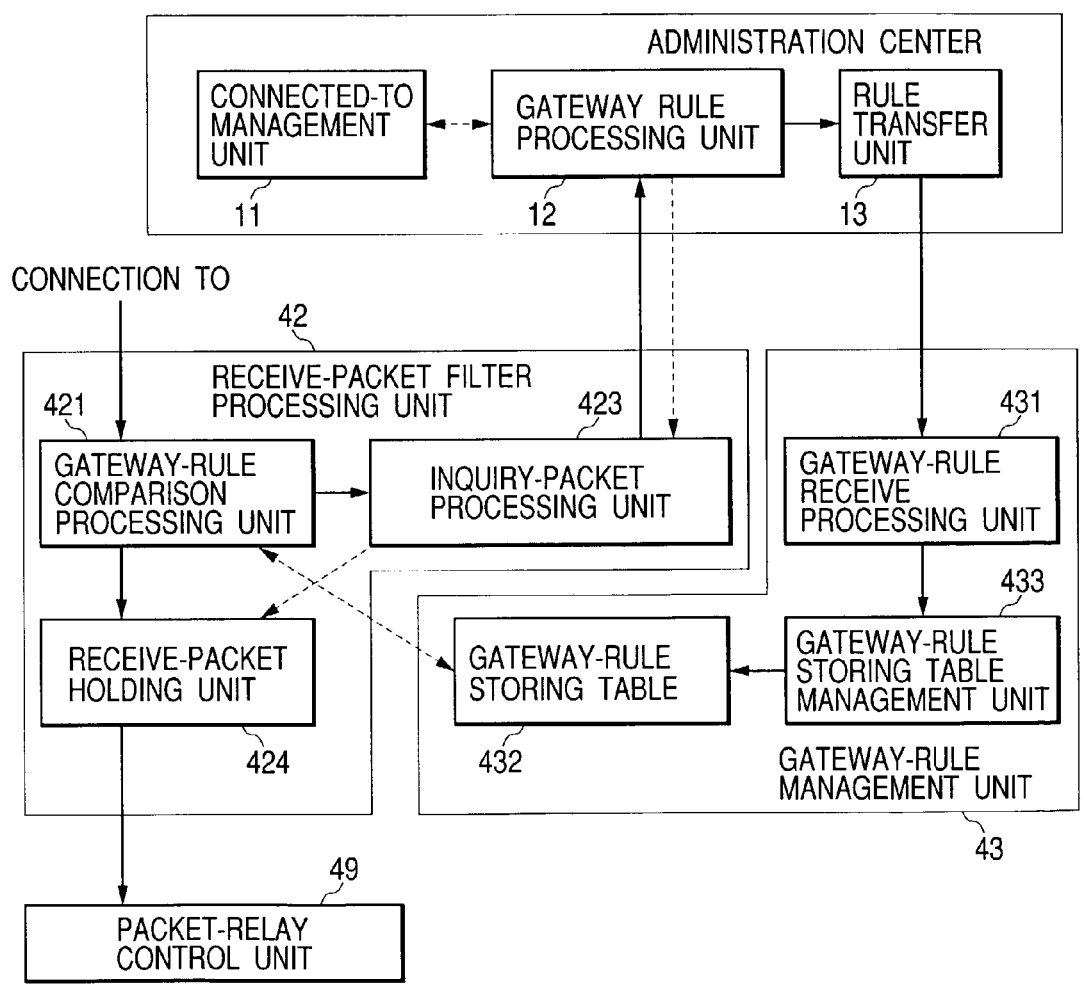
FIG. 12 is a diagram illustrating a configuration of a network gateway device relating to receive processing, and its data flow, according to a second embodiment of the present invention.

(II-1) Configuration of the Network Gateway Device Relating to Receive Processing and its Data Flow FIG. 12 is a diagram illustrating the configuration of the network gateway device relating to the receive processing, and its data flow, according to the second embodiment of the present invention.

The total configuration is substantially the same as that of the first embodiment shown in FIG. 2. However, a point of difference is that the receive-packet filter processing unit 42 has an inquiry-packet processing unit 423 and a receive-packet holding unit 424.

The inquiry-packet processing unit 423 is a part whereby if an unidentified receive packet whose gateway rule is not defined in the network gateway device comes, an inquiry packet is transmitted to the administration center 1 and then a response as to processing of the packet is received.

The receive-packet holding unit 424 is a part whereby if an unidentified receive packet comes, the packet is held until a response to an inquiry sent to the administration center 1 returns.

(II-2) Packet Receive Processing of the Network Gateway Device 4

Next, packet receive processing of the network gateway device 4 will be described with reference to FIG. 13.

Figure 13:
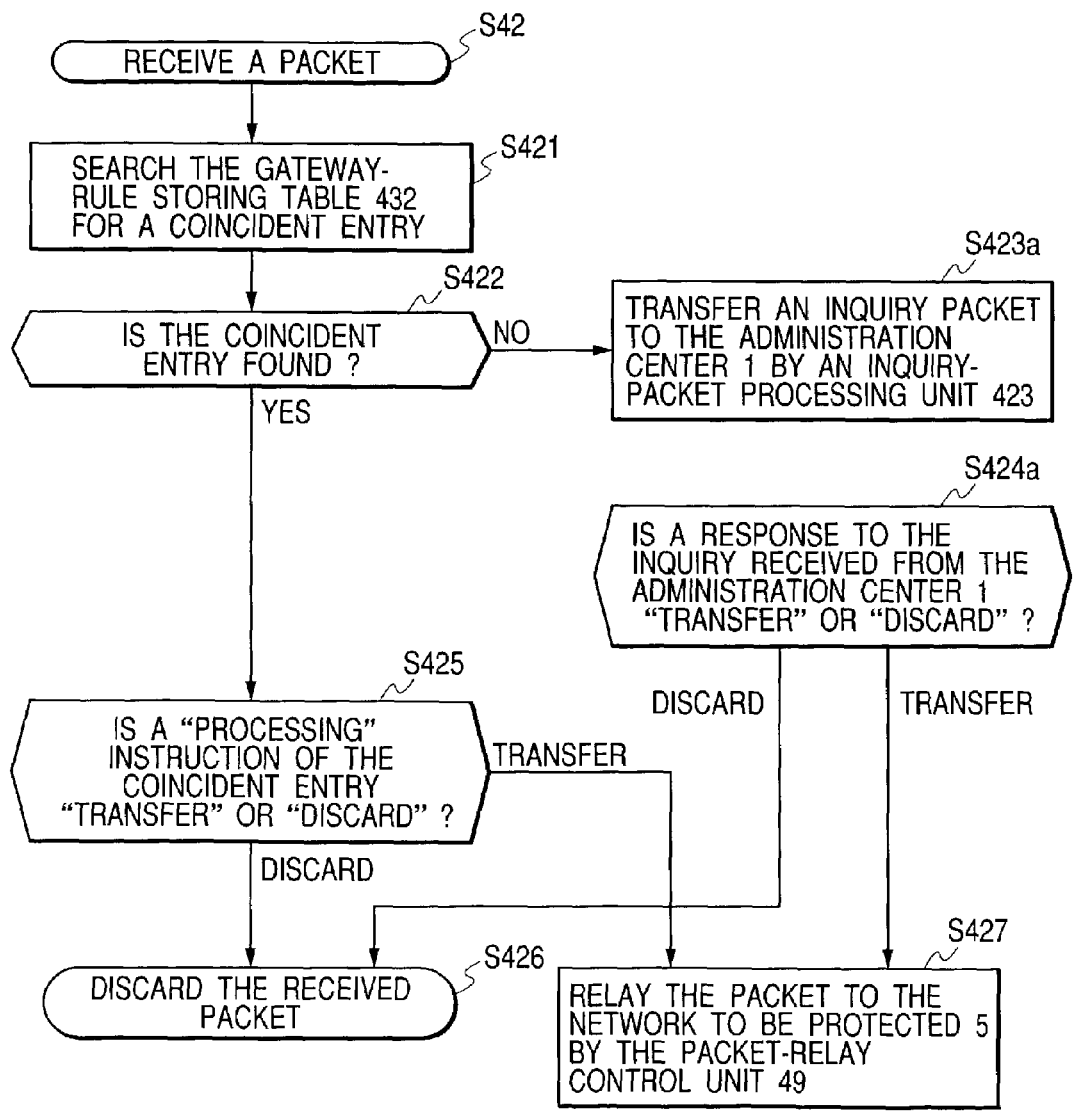
FIG. 13 is a flowchart illustrating a flow of receive packet processing by the receive-packet filter processing unit 42 of the network gateway device 4 according to the second embodiment.

FIG. 13 is a flowchart illustrating a flow of receive packet processing by the receive-packet filter processing unit 42 of the network gateway device 4 according to the second embodiment.

In this embodiment, a packet is received from a connection-to (S421), and then the gateway-rule storing table 432 is searched for an entry having an appropriate gateway rule (S422). If the entry is not found, the inquiry-packet processing unit 423 is used to transfer an inquiry packet to the administration center 1 instead of performing processing of S423 in the first embodiment (S423*a*). After that, the unidentified receive packet is held in the receive-packet holding unit 424.

As a result of receiving from the administration center 1 a response to the inquiry (S424*a*), if the response is "discard", the unidentified receive packet held in the receive-packet holding unit 424 is discarded (S426). If the response is "transfer", the unidentified receive packet is passed to the packet-relay control unit 49 to relay the packet to the network to be protected 5 (S427).

(III) Inquiry-Packet Acceptance Processing by the Administration Center 1 for an Unidentified Receive Packet Next, unidentified receive-packet acceptance processing of the administration center 1 will be described with reference to FIG. 14.

Figure 14:
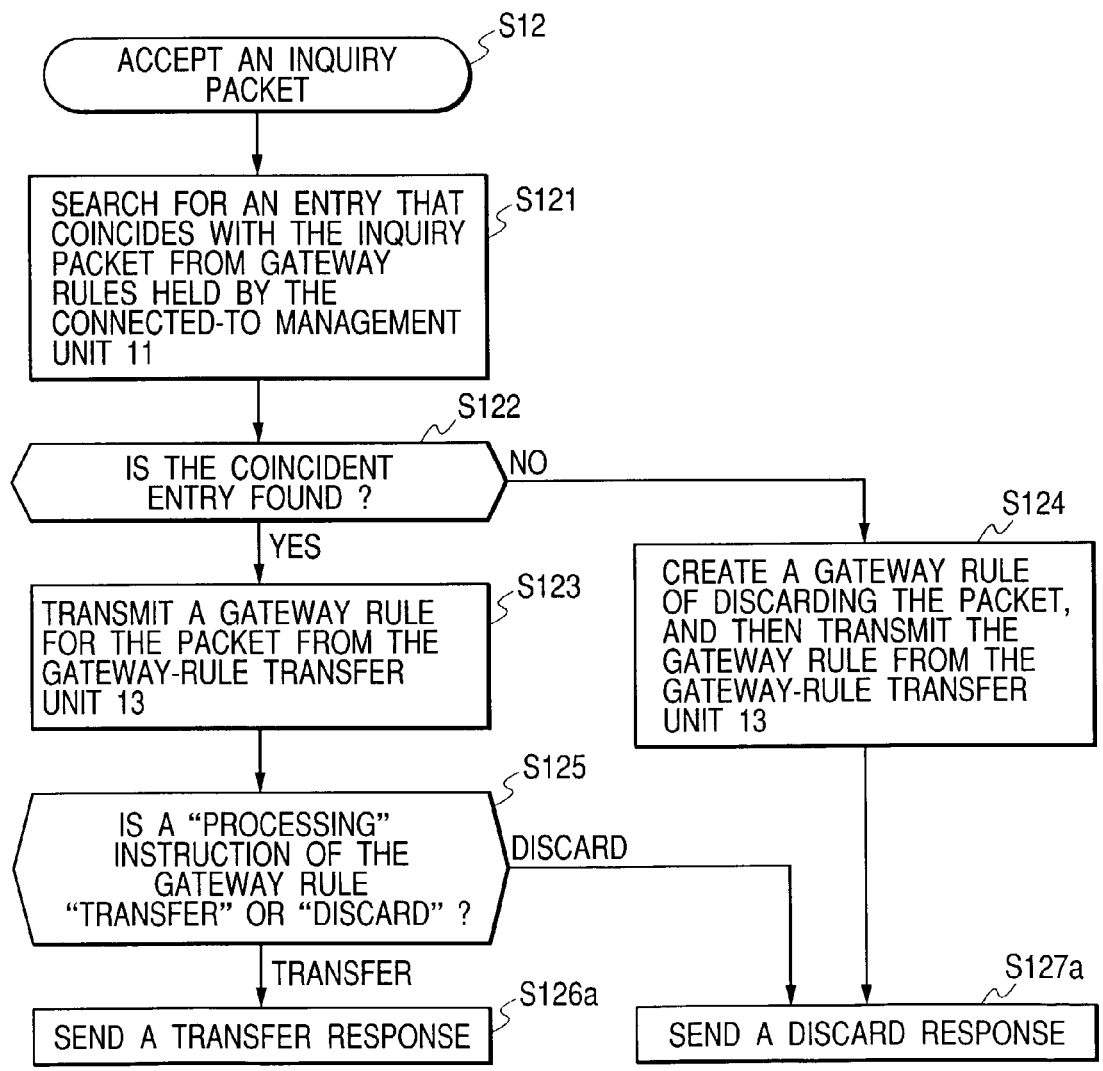
FIG. 14 is a flowchart illustrating a flow of inquiry-packet acceptance processing by the administration center 1 for an unidentified receive packet.

FIG. 14 is a flowchart illustrating a flow of the inquiry-packet acceptance processing by the administration center 1 for an unidentified receive packet.

As described above, if a gateway rule of a receive packet is not defined in the network gateway device 4, an inquiry packet is transferred to the administration center 1.

Upon acceptance of the inquiry packet transferred from the network gateway device 4, the gateway rule processing unit 12 of the administration center 1 searches gateway rules held by the connected-to management unit 11 for an entry that coincides with the inquiry packet (S121a).

If the coincident entry is not found (S122), a gateway rule of discarding the packet is created, and then the gateway rule is transmitted from the rule transfer unit 13 to the gateway-rule management unit 43 of the network gateway device 4 which is a source of the unidentified receive packet (S124) so that a response to the effect that the unidentified receive packet is discarded is sent to the network gateway device 4 (S127a).

If the coincident entry is found (S112), the gateway rule is transmitted from the rule transfer unit 13 to the gateway-rule management unit 43 of the network gateway device 4 which is a source of the inquiry packet (S123). Then, as a result of referring to a "processing" instruction of the gateway rule by the gateway-rule management unit 43 (S125), if the "processing" instruction is "discard" that does not permit a connection, a response to the effect that the receive packet is discarded is sent to the network gateway device 4 (S127a); and if the "processing" instruction is "transfer" that permits a connection, a response to the effect that the packet is transferred is sent to the network gateway device 4 (S126a).

(IV) Transmission Processing of the Network Gateway Device

Next, transmission processing of the network gateway device according to the second embodiment of the present invention will be described with reference to FIGS. 15 to 17.

(IV-1) Configuration of the Network Gateway Device Relating to the Transmission Processing and its Data Flow To begin with, a configuration of the network gateway device relating to the transmission processing, and its data flow, will be described with reference to FIG. 15.

Figure 15:
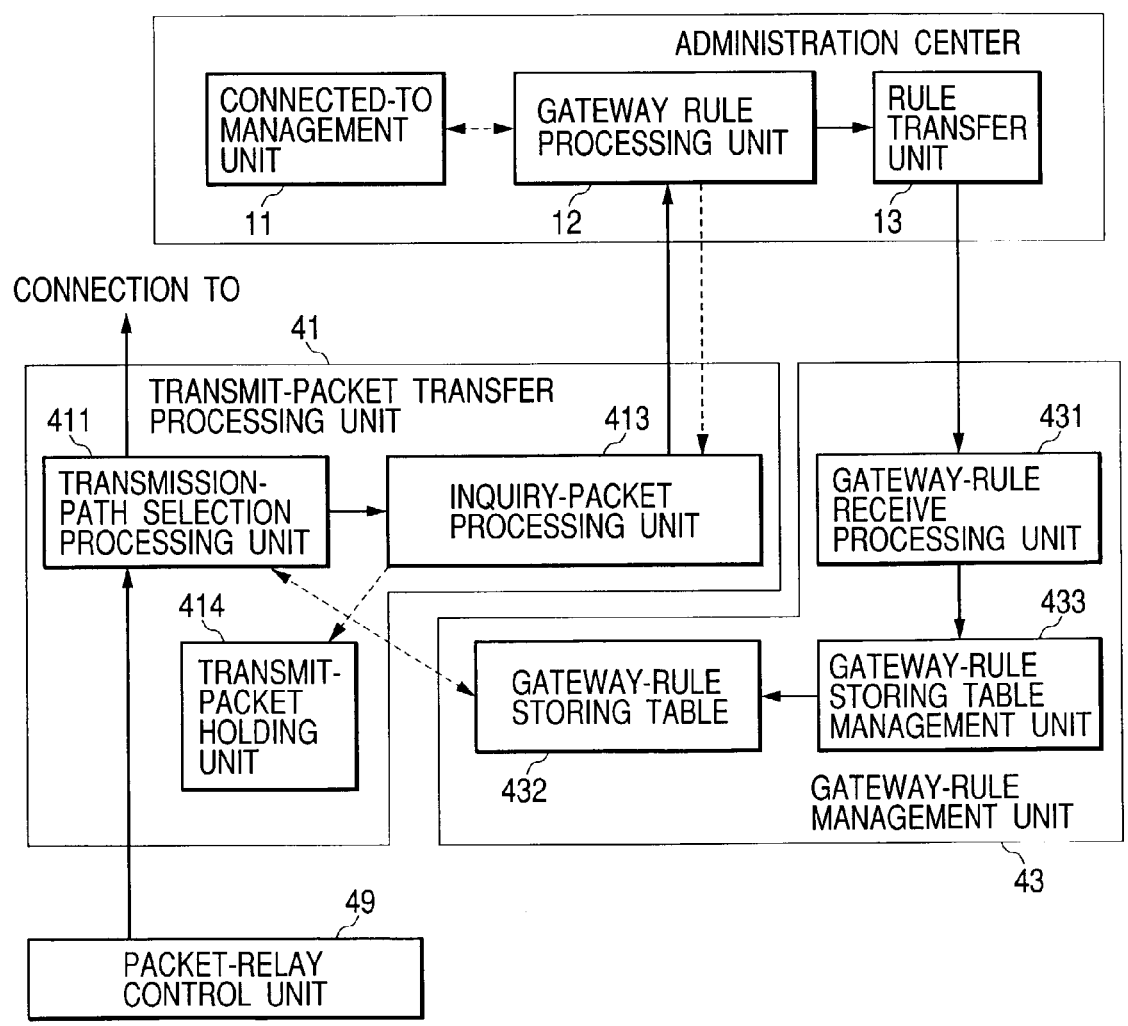
FIG. 15 is a diagram illustrating a configuration of a network gateway device relating to transmission processing, and its data flow, according to the second embodiment of the present invention.

FIG. 15 is a diagram illustrating the configuration of the network gateway device relating to the transmission processing, and its data flow, according to the second embodiment of the present invention.

The total configuration is substantially the same as that of the first embodiment shown in FIG. 8. However, a point of difference is that the transmit-packet filter processing unit 423 has an inquiry-packet processing unit 413 and a transmit-packet holding unit 424.

The inquiry-packet processing unit 423 is a part whereby if an unidentified transmit packet whose gateway rule is not defined in the network gateway device comes, an inquiry packet is transmitted to the administration center 1 and then a response as to processing of the packet is received.

The transmit-packet holding unit 414 is a part whereby if an unidentified transmit packet comes, the packet is held until a response to an inquiry sent to the administration center 1 returns.

(IV-2) Packet Transmission Processing of the Network Gateway Device 4

Next, packet transmission processing of the network gateway device 4 will be described with reference to FIG. 16.

Figure 16:
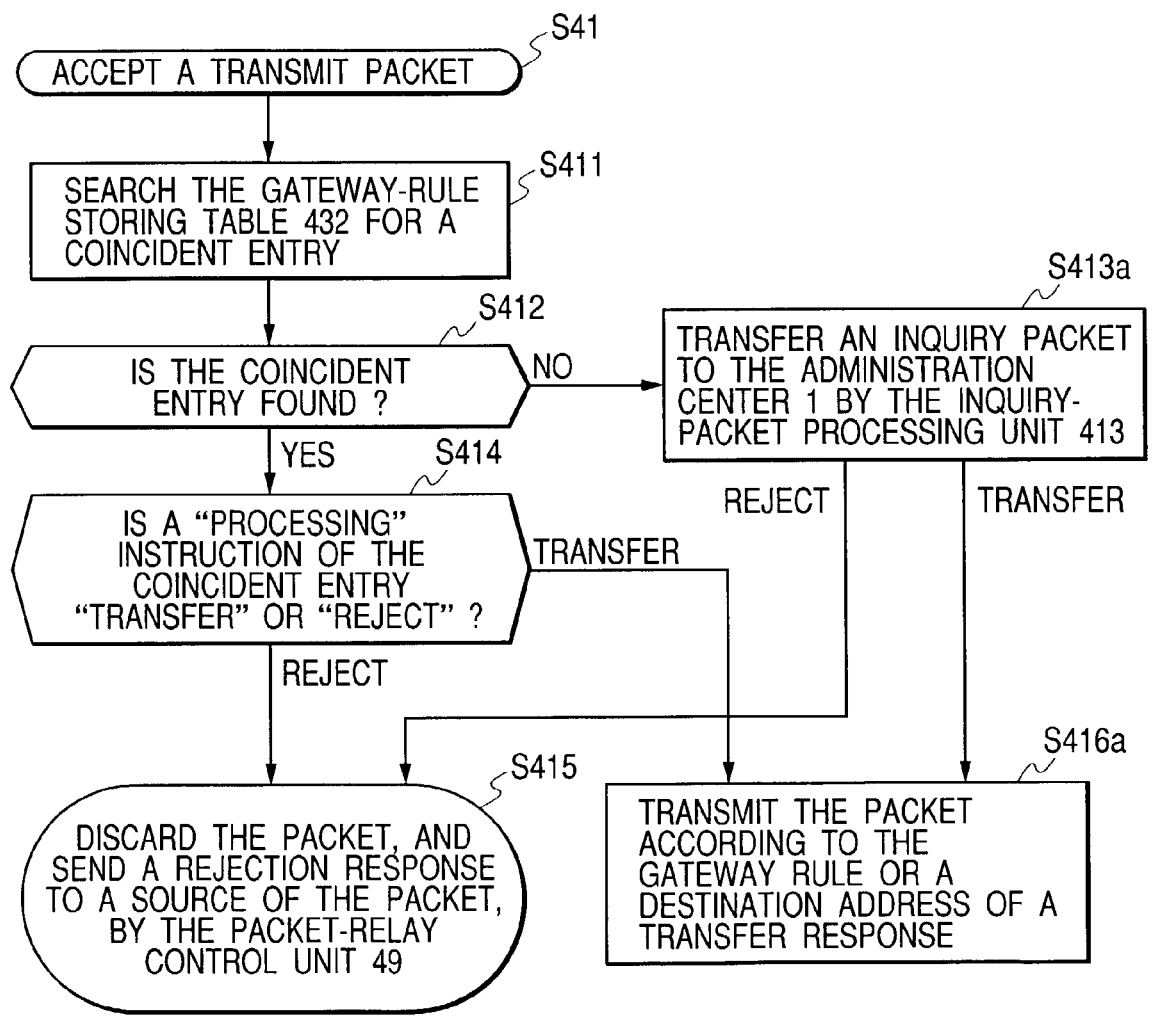
FIG. 16 is a flowchart illustrating a flow of transmit packet processing by the transmit-packet transfer processing unit 41 of the network gateway device 4 according to the second embodiment.

FIG. 16 is a flowchart illustrating a flow of transmit packet processing by the transmit-packet transfer processing unit 41 of the network gateway device 4 according to the second embodiment.

In this embodiment, a packet is received from the network to be protected 5, and then the gateway-rule storing table 432 is searched for an entry having an appropriate gateway rule (S412). If the entry is not found, the inquiry-packet processing unit 413 is used to transfer an inquiry packet to the administration center 1 instead of performing processing of S413 in the first embodiment (S413a). After that, an unidentified transmit packet is held in the transmit-packet holding unit 414.

As a result of receiving from the administration center 1 a response to the inquiry (S414), if the response is "discard", the unidentified receive packet held in the transfer-packet holding unit 414 is discarded and then a rejection response is sent to a source of the packet in the network to be protected 4 (S415). If the response is "transfer", the unidentified receive packet is passed to the packet-relay control unit 49 to relay the packet to the network to be protected 5 (S416a).

(V) Inquiry-Packet Acceptance Processing by the Administration Center 1 for an Unidentified Transmit Packet Next, unidentified transmit-packet acceptance processing of the administration center 1 will be described with reference to FIG. 17.

FIG. 17 is a flowchart illustrating a flow of the inquiry-packet acceptance processing by the administration center 1 for an unidentified transmit packet.

The inquiry-packet acceptance processing of the administration center relating to a receive packet has been described in item (III). Here, processing is the same except that the processing relates to a transmit packet instead of a receive packet.

(VI) Advantages of this Embodiment

In this embodiment, when an unidentified receive packet or an unidentified transmit packet comes, an inquiry packet is transmitted to the administration center 1. Hence, an increase in traffic between the administration center 1 and the network device 4 can be suppressed. In addition to it, the received packet will not be lost during the transfer.

According to the present invention, in a network gateway system having a network gateway device that inter-connects networks, handling a packet according to a gateway rule used to control the packet in the network gateway device to ensure the security, and centrally controlling the gateway rule in an administration center, permit the network gateway system to become easy to use, and consequently an individual user is not required to be conscious of operation such as a fire wall.

In addition, according to the present invention, transferring from the administration center a gateway rule used for a packet received in the network gateway device, and using the gateway rule for a fixed period of time to handle the packet makes it possible to provide a network gateway system in which a network load can be reduced.

What is claimed is:

1. A network gateway system having a network gateway device that interconnects networks, said network gateway system comprising:

an administration center that holds and creates a gateway rule for controlling a packet, wherein said network gateway device holds the gateway rule;

wherein when receiving a packet, if a gateway rule corresponding to the received packet exists, said network gateway device handles the received packet according to the gateway rule;

wherein if there is no gateway rule corresponding to the received packet, said network gateway device transfers the received packet to the administration center, and then receives a gateway rule corresponding to the packet from the administration center to perform update;

wherein in the network gateway device, an effective time during which the gateway rule is held is determined, and thereby a gateway rule whose effective time has expired is deleted, and wherein said network gateway device comprises a gateway-rule storing table for holding the gateway rules; and wherein when receiving the gateway rule from the administration center, if no space area in the gateway-rule storing table exists, a gateway-rule entry with the shortest remaining effective time is first deleted from among the gateway rules stored in the gateway-rule storing table.

2. A network gateway system according to claim 1, wherein:

if the administration center holds a gateway rule corresponding to the packet transmitted from the network gateway device, the administration center transmits the gateway rule; and if the administration center does not hold the gateway rule corresponding to the packet transmitted from the network gateway device, the administration center newly creates a gateway rule corresponding to the packet, transmits the gateway rule to the network gateway device, and handles the packet according to the corresponding gateway rule.

3. A network gateway system having a network gateway device that interconnects networks, said network gateway system comprising:

an administration center that holds and creates a gateway rule for controlling a packet, wherein said network gateway device holds the gateway rule;

wherein when receiving a packet, if a gateway rule corresponding to the received packet exists, said network gateway device handles the received packet according to the gateway rule;

wherein if no gateway rule corresponding to the received packet exists, an inquiry about a gateway rule corresponding to the received packet is sent to the administration center, and the gateway rule corresponding to the packet is received from the administration center so that update is performed, and according to the received gateway rule, the received packet is controlled;

wherein in the network gateway device, an effective time during which the gateway rule is held is determined, and thereby a gateway rule whose effective time has expired is deleted;

wherein said network gateway device comprises a gateway-rule storing table for holding the gateway rules; and wherein when receiving the gateway rule from the administration center, if no space area in the gateway-rule storing table exists, a gateway-rule entry with the shortest remaining effective time is first deleted from among the gateway rules stored in the gateway-rule storing table.

4. A network gateway system according to claim 3, wherein:

when the administration center receives an inquiry from the network gateway device, if the administration center holds a gateway rule corresponding to the inquired packet, the administration center transmits the gateway rule; and if the administration center does not hold a gateway rule corresponding to the inquired packet, the administration center newly creates a gateway rule corresponding to the packet, and then transmits the gateway rule to the network gateway device.

5. A network gateway method of a network gateway system having a network gateway device that interconnects networks, wherein said network gateway system comprises an administration center that holds and creates a gateway rule for controlling a packet, said network gateway device executing the steps of:

holding the gateway rules, and when receiving a packet, if a gateway rule corresponding to the received packet exists, handling the received packet according to the gateway rule;

if no gateway rule corresponding to the received packet exists, transferring the received packet to the administration center;

receiving a gateway rule corresponding to the packet from the administration center to perform update;

in the network gateway device, determining an effective time during which the gateway rule is held, and deleting a gateway rule whose effective time has expired, wherein said network gateway device comprises a gateway-rule storing table for holding the gateway rules; and wherein said network gateway device further executes the step of:

when receiving the gateway rule from the administration center, if no space area in the gateway-rule storing table exists, first deleting a gateway-rule entry with the shortest remaining effective time from among the gateway rules stored in the gateway-rule storing table.

6. A network gateway method according to claim 5, wherein said administration center executes the steps of:

if a gateway rule corresponding to a packet transmitted from the network gateway device is held, transmitting the gateway rule;

if a gateway rule corresponding to the packet transmitted from the network gateway device is not held, newly creating a gateway rule corresponding to the packet, and then transmitting the gateway rule to the network gateway device; and handling the packet according to the corresponding gateway rule.

7. A network gateway method of a network gateway system having a network gateway device that interconnects networks, wherein said network gateway system comprises an administration center that holds and creates a gateway rule for controlling a packet, said network gateway device executing the steps of:

holding the gateway rule, and when receiving a packet, if a gateway rule corresponding to the received packet exists, handling the received packet according to the gateway rule;

if no gateway rule corresponding to the received packet exists, sending an inquiry about a gateway rule corresponding to the received packet to the administration center; and receiving the gateway rule corresponding to the packet from the administration center to perform update, and thereby controlling the received packet according to the received gateway rule;

in the network gateway device, determining an effective time during which the gateway rule is held, and deleting a gateway rule whose effective time has expired, wherein said network gateway device comprises a gateway-rule storing table for holding the gateway rules; and wherein said network gateway device further executes the step of:

when receiving the gateway rule from the administration center, if no space area in the gateway-rule storing table exists, first deleting a gateway-rule entry with the shortest remaining effective time from among the gateway rules stored in the gateway-rule storing table.

8. A network gateway method according to claim 7, wherein said administration center executes the steps of:

when receiving an inquiry from the network gateway device, if the administration center holds a gateway rule corresponding to the inquired packet, transmitting the gateway rule; and if the administration center does not hold a gateway rule corresponding to the inquired packet, newly creating a gateway rule corresponding to the packet, and then transmitting the gateway rule to the network gateway device.

9. A computer readable medium including instructions to be executed in a network gateway device that interconnects networks, wherein a network gateway system comprises said network gateway device and an administration center that holds and creates a gateway rule for controlling a packet, said instructions comprising steps for:

holding the gateway rules, and when receiving a packet, if a gateway rule corresponding to the received packet exists, handling the received packet according to the gateway rule;

if no gateway rule corresponding to the received packet exists, transferring the received packet to the administration center;

receiving a gateway rule corresponding to the packet from the administration center to perform update;

in the network gateway device, determining an effective time during which the gateway rule is held, and deleting a gateway rule whose effective time has expired, wherein said network gateway device comprises a gateway-rule storing table for holding the gateway rules; and wherein said instructions further comprises:

when receiving the gateway rule from the administration center, if no space area in the gateway-rule storing table exists, first deleting a gateway-rule entry with the shortest remaining effective time from among the gateway rules stored in the gateway-rule storing table.

10. A computer readable medium according to claim 9, wherein said administration center executes the steps of:

if a gateway rule corresponding to a packet transmitted from the network gateway device is held, transmitting the gateway rule;

if a gateway rule corresponding to the packet transmitted from the network gateway device is not held, newly creating a gateway rule corresponding to the packet, and then transmitting the gateway rule to the network gateway device; and handling the packet according to the corresponding gateway rule.

11. A computer readable medium including instructions to be executed in a network gateway device that interconnects networks, wherein a network gateway system comprises said network gateway device and an administration center that holds and creates a gateway rule for controlling a packet, said instructions comprising steps for:

holding the gateway rule, and when receiving a packet, if a gateway rule corresponding to the received packet exists, handling the received packet according to the gateway rule;

if no gateway rule corresponding to the received packet exists, sending an inquiry about a gateway rule corresponding to the received packet to the administration center; and receiving the gateway rule corresponding to the packet from the administration center to perform update, and thereby controlling the received packet according to the received gateway rule;

in the network gateway device, determining an effective time during which the gateway rule is held, and deleting a gateway rule whose effective time has expired, wherein said network gateway device comprises a gateway-rule storing table for holding the gateway rules; and wherein said instructions further comprises:

when receiving the gateway rule from the administration center, if no space area in the gateway-rule storing table exists, first deleting a gateway-rule entry with the shortest remaining effective time from among the gateway rules stored in the gateway-rule storing table.

12. A computer readable medium according to claim 11, wherein said administration center executes the steps of:

when receiving an inquiry from the network gateway device, if the administration center holds a gateway rule corresponding to the inquired packet, transmitting the gateway rule; and if the administration center does not hold a gateway rule corresponding to the inquired packet, newly creating a gateway rule corresponding to the packet, and then transmitting the gateway rule to the network gateway device.

* * * * *